US011104034B2

(12) United States Patent
Palumbo (10) Patent No.: US 11,104,034 B2
(45) Date of Patent: *Aug. 31, 2021

(54) DIGITAL DECORATING MACHINE FOR CERAMIC PRODUCTS

(71) Applicant: Projecta Engineering S.r.l., Fiorano Modenese (IT)

(72) Inventor: Vincenzo Palumbo, Sassuolo (IT)

(73) Assignee: PROJECTA ENGINEERING S.R.L., Fiorano Modenese (IT)

(*) Notice: Subject to any disclaimer, the term of this patent is extended or adjusted under 35 U.S.C. 154(b) by 89 days.

This patent is subject to a terminal disclaimer.

(21) Appl. No.: 16/440,226

(22) Filed: Jun. 13, 2019

(65) Prior Publication Data

US 2019/0291300 A1 Sep. 26, 2019

Related U.S. Application Data (62) Division of application No. 15/561,870, filed as application No. PCT/IB2015/055389 on Jul. 16, 2015, now Pat. No. 10,363,683.

(30) Foreign Application Priority Data

Jun. 18, 2015 (WO) .................. PCT/IB2015/054602

(51) Int. Cl.
  *B28B 11/00* (2006.01)
  *B05C 5/02* (2006.01)
  (Continued)

(52) U.S. Cl.
  CPC ............ *B28B 11/001* (2013.01); *B05C 5/027* (2013.01); *B05C 5/0291* (2013.01);
  (Continued)

(58) Field of Classification Search
  CPC ..... B28B 11/001; B28B 11/048; B28B 11/00; B41J 2202/21; B41J 25/001; B41J 3/407;
  (Continued)

(56) References Cited

U.S. PATENT DOCUMENTS

| 4,841,306 A | 6/1989 | Archer et al. |
| 10,363,683 B2 * | 7/2019 | Palumbo |

(Continued)

FOREIGN PATENT DOCUMENTS

| CN | 203528083 | 4/2014 |
| WO | 2014/047515 | 3/2014 |

OTHER PUBLICATIONS

English Translation of CN203528083, Yongtian, published Apr. 9, 2014. (Year: 2014).*

(Continued)

*Primary Examiner* — Laura Edwards
(74) *Attorney, Agent, or Firm* — Tutunjian & Bitetto, P.C.

(57) ABSTRACT

A Digital decorating machine for ceramic products, including a conveyor, suitable to transport the products to be decorated (P) along a feed direction (A), and a plurality of decoration modules, positioned over the conveyor and adjacent to each other along the feed direction (A). The modules include respective printing heads provided with nozzles for ejecting a fluid to be delivered on the surface of the products to be decorated (P); the conveyor includes a movable member for supporting the products to be decorated (P), suitable for translating them along the feed direction (A). The conveyor includes at least a supporting surface, located along a respective flank of the movable member, including in turn a plurality of predetermined positioning zones for the removable engagement of respective coupling portions of the decoration modules.

23 Claims, 4 Drawing Sheets

(51) Int. Cl.
*B28B 11/04* (2006.01)
*B41J 3/407* (2006.01)
*B41J 3/54* (2006.01)
*B41J 25/00* (2006.01)

(52) U.S. Cl.
CPC ............ *B28B 11/048* (2013.01); *B41J 3/407* (2013.01); *B41J 3/543* (2013.01); *B41J 25/001* (2013.01); *B41J 2202/21* (2013.01); *Y02P 40/60* (2015.11)

(58) Field of Classification Search
CPC ........ B41J 3/543; B05C 5/027; B05C 5/0291; Y02P 40/60
USPC .............................. 118/313, 314, 324, 69, 46
See application file for complete search history.

(56) References Cited

U.S. PATENT DOCUMENTS

2013/0206058 A1* 8/2013 Mauck et al.
2013/0307915 A1* 11/2013 Persons et al.

OTHER PUBLICATIONS

International Search Report for PCT/IB2015/055389 dated Apr. 29, 2016 (4 pages).

* cited by examiner

DIGITAL DECORATING MACHINE FOR CERAMIC PRODUCTS

CROSS-REFERENCE TO RELATED APPLICATIONS

This application is a Divisional of U.S. patent application Ser. No. 15/561,870 filed on Sep. 26, 2017, now U.S. Pat. No. 10,363,683 which is a U.S. National Stage of International Application No. PCT/US2015/055389 filed Jul. 16, 2015 which claims priority to International Application No. PCT/IB2015/054602 filed on Jun. 18, 2015.

TECHNICAL FIELD OF THE INVENTION

The present invention relates to a digital decorating machine for ceramic products.

More in particular, the present invention relates to a digital decorating machine for ceramic products such as tiles and the like.

STATE OF THE PRIOR ART

In the field of the production of ceramic tiles and the like decoration lines are normally employed that apply inks and/or enamels to the surface of the ceramic support, suitable to create both a certain aesthetic and decorative effect and a functional result of protection and coverage of the support itself.

Currently, so called digital decorating machines are increasingly used in the field.

Such machines apply ink and/or enamel on the ceramic support—normally a flat, or substantially flat, support, such as a tile—by means of heads that deliver a jet actuated by piezoelectric controlled nozzles or nozzles of other type, whose actuation and adjustment are driven for the purposes of the decorative process in a digital manner.

The use of digital decorating machines is now widely preferred mainly because they allow obtaining a very high graphic resolution in the application of the decorative and/or protective product on the ceramic support.

Indeed, the current technologies allow simulating, with truly surprising results, natural materials such as wood, marble, granite, or the like.

The digital decorating machines of the aforementioned type provide for a printing area of the ceramic supports comprising a plurality of adjacent modules; each of such modules is provided with respective heads for delivering ink or enamel on the surface of the supports themselves.

Each printing module is equipped with means for supplying a single type of ink or enamel to said delivery heads; for example, each module is typically suitable for delivering one ink of a certain colour.

The digital decorating machines currently present on the market are not free from drawbacks.

In fact, if the early versions of digital decorating machines were suitable to operate exclusively in the classic quadrichromy mode (which requires, indeed, the presence of four corresponding decoration modules), the modern machines must be able to work by applying inks or other fluids on the products, which were already previously prepared with the desired final colours, that can obviously be quite numerous.

Therefore, to meet these production needs, modern digital machines can also include a very high number of decoration modules, since in this way the versatility and the production capacity of the machine itself are greatly increased.

However, there are some production situations in which, among many modules present on the machine, only a few are actually used simultaneously.

Or, in some extreme cases, it may be functioning only one module, namely that corresponding to the desired colour.

This means that all modules that are not operating in a particular decoration work, may be adversely affected by their own inactivity, as—for example—their printing heads are still highly exposed to degrading agents, such as high temperatures and ink particles in suspension, that can lead to rapid oxidation of the same or at least can determine, in the printing heads themselves, malfunction conditions which need to be remedied with waste of resources and loss of time.

But in addition to the above operating conditions potentially harmful to the printing modules, it should also be noted, more generally, that the presence, on a given machine, of several modules which are inactive for a prolonged period of time also constitutes, however, a substantial cost for the user—for example in terms of energy expenditure, or maintenance—not justified by actual production needs. Therefore there is the need, in the field, to remedy such drawbacks.

SUMMARY OF THE INVENTION

The technical task of the present invention is therefore to improve the state of the art.

Within such technical task, an object of the present invention is to provide a digital decorating machine for ceramic products that allows overcoming the previously lamented drawbacks.

Another object of the present invention is to achieve a digital decorating machine for ceramic products that allows preserving the possibly non-operative heads during a certain decoration work.

A further object of the present invention is to make available a digital decorating machine for ceramic products enabling the user of the machine to achieve a saving in terms of energy resources, maintenance of the parts, and the like.

Another object of the present invention is to devise a digital decorating machine for ceramic products more versatile than the machines currently available on the market.

This task and these objects are attained by the digital decorating machine for ceramic products according to the present application.

The digital decorating machine for ceramic products according to the invention comprises at least a conveyor, suitable to transport the products to be decorated along a feed direction, and a plurality of decoration modules, positioned over the conveyor and adjacent to each other along the feed direction of the products.

The above cited modules comprise respective printing heads provided with nozzles for ejecting a fluid to be delivered on the surface of the products to be decorated.

The conveyor comprises at least a movable member for supporting the products to be decorated, suitable for translating them along the feed direction; for example, such movable member can be constituted, or can comprise, the upper portion of a belt, a chain, or the like.

According to an aspect of the present invention, the conveyor comprises at least a supporting surface, located along a respective flank of the movable member, provided with a plurality of predetermined positioning zones for the removable engagement of respective coupling portions of the decoration modules.

Thanks to this solution, it is possible to achieve a machine which is completely modular and fitted according to the user.

In fact, contrary to what foreseen in the machines of known type, the user can set up the machine totally at its own discretion only expecting the number of modules strictly necessary to perform a given decoration work; the unnecessary modules can instead be easily removed and, for example, positioned on another similar machine.

According to another aspect of the present invention, each module houses, in a completely independent way from the rest of the machine, all the components necessary for its proper operation, including the fluid supply.

Therefore, each decoration module can be individually removed and placed on another machine, or placed in the warehouse waiting for a future use.

The present application refers to preferred and advantageous embodiments of the invention.

BRIEF DESCRIPTION OF THE DRAWINGS

The characteristics of the invention will be better understood by any man skilled in the art from the following description and the enclosed set of drawings, given as a non-limiting example, in which.

DETAILED DESCRIPTION OF THE INVENTION

Figure 1:
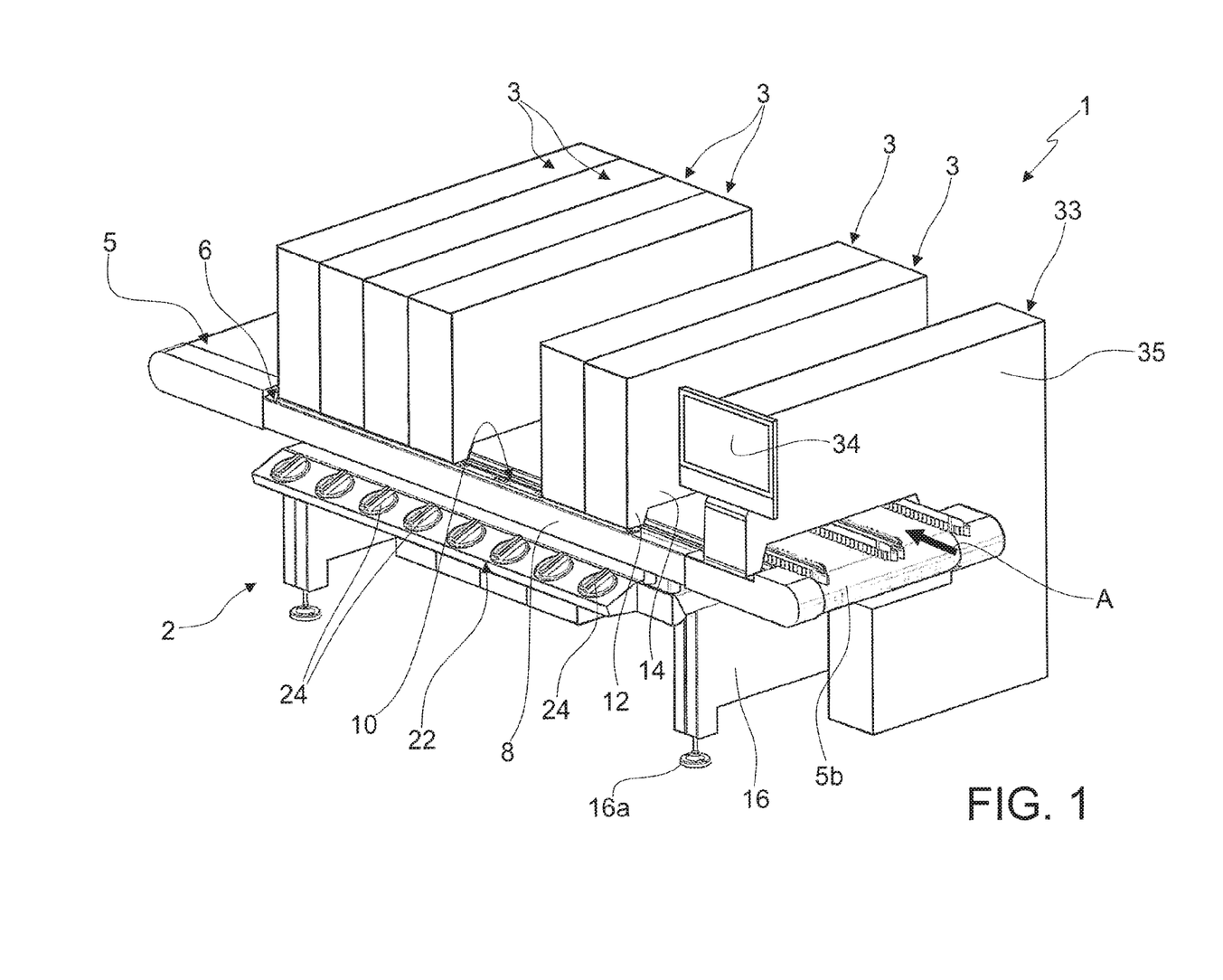
FIG. 1 is an axonometric view of a digital decorating machine according to the invention.

With reference to the enclosed FIG. 1, a digital decorating machine for ceramic products according to the present invention is indicated as a whole with 1.

The machine 1 according to the invention is particularly, but not exclusively, intended for the application of decorative and/or protective fluids, such as inks, enamels and the like on products such as ceramic tiles and the like; however, as already mentioned above, the machine 1 according to the invention is absolutely for general use and could also be employed for other types of ceramic and non-ceramic products, without any limitation.

Furthermore, it is specified that the decorating machine 1 according to the present invention is suitable for the application of fluids such as inks, enamels and the like on ceramic products in any state, that is for example green or fired.

In the following description, therefore, it is assumed that the products to be decorated consist of ceramic tiles, of any form or shape.

The machine 1 according to the invention can be installed in the context of a complete decoration line for ceramic tiles, which is assumed to comprise, for example, other machines 1 of the same type, or possibly also of other type.

The machine 1 comprises at least a conveyor 2.

The conveyor 2 is suitable to transport the products to be decorated P (schematically shown in FIG. 4) along a certain feed direction A.

Moreover, the machine 1 comprises a plurality of decoration modules 3.

It is noted that, in the context of the present description, as well as in the enclosed claims, with the term "decoration", referred in particular to the aforesaid modules 3, it is intended to indicate, in general, both the application, on the surface of the products P, of decorative fluids in the strict sense, such as coloured inks and the like, and the application of other products such as protective enamels, and still others, without any limitation to the objects of the present invention.

The decoration modules 3 are positioned over the conveyor 2, and adjacent to each other along the feed direction of the products P.

As can be appreciated, on the machine 1 can be provided for any number of modules 3, without any limitation.

The decoration modules 3 comprise respective printing heads 4.

The printing heads 4 are provided with nozzles for ejecting a fluid to be delivered on the surface of the products P to be decorated.

Figure 3:
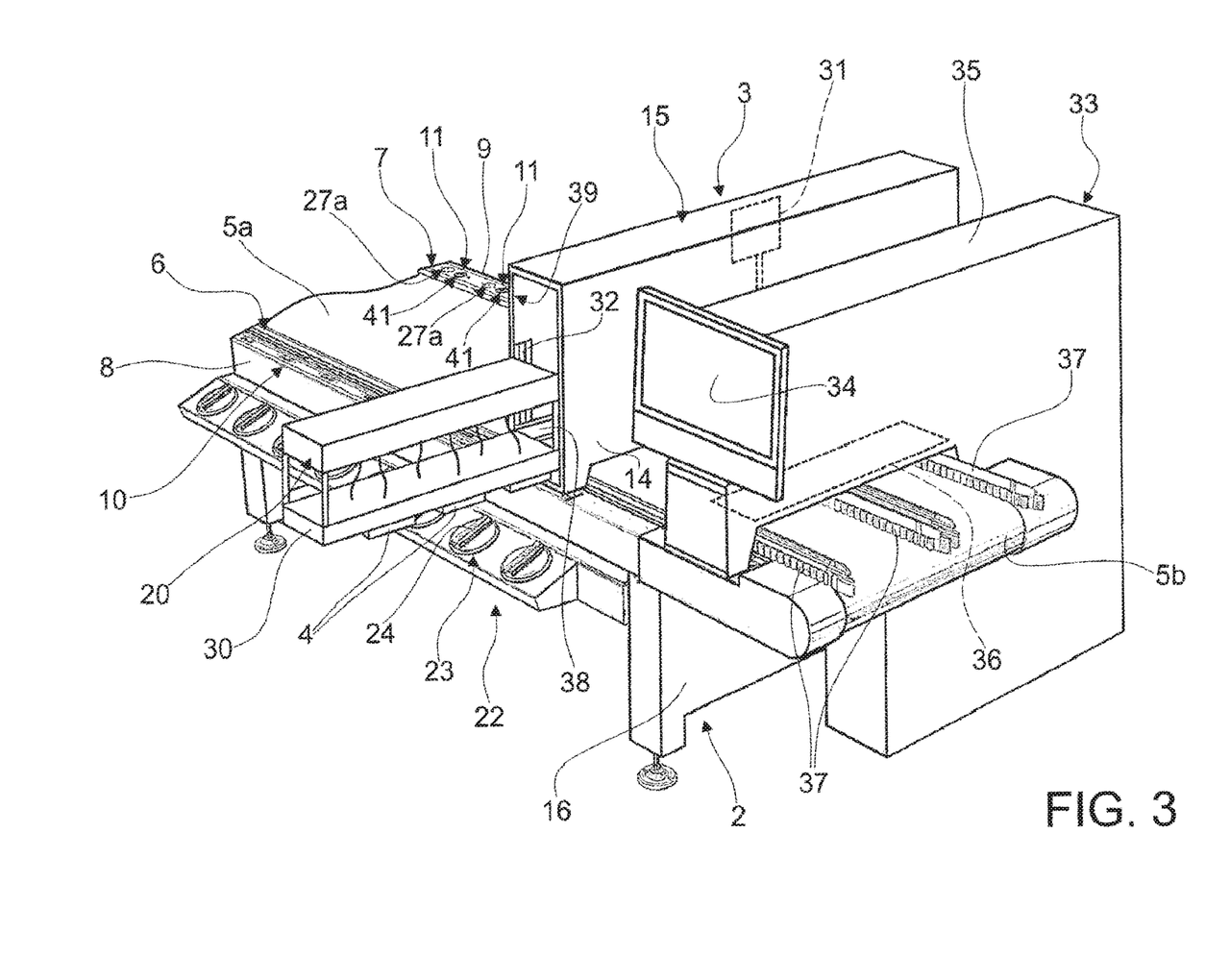
FIG. 3 is a perspective view of the machine with some of the decoration modules removed from the conveyor.
Figure 4:
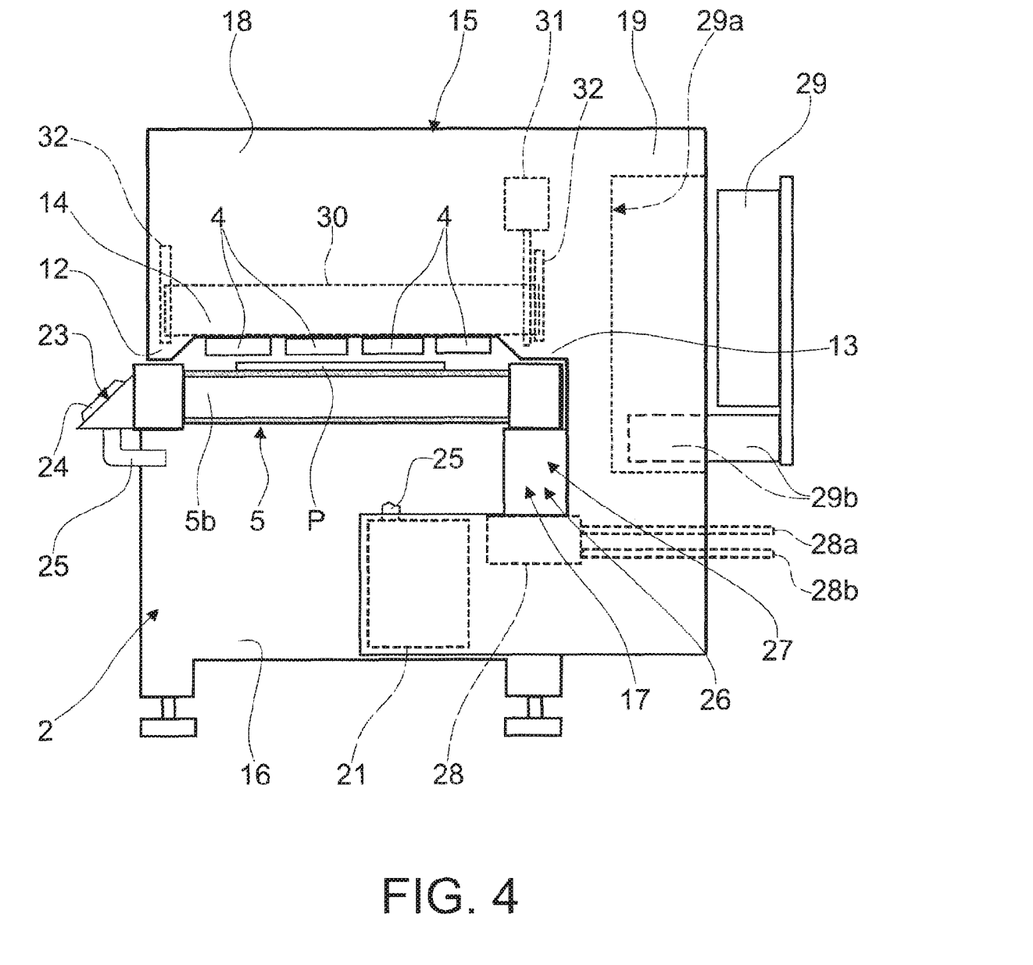
FIG. 4 is a lateral schematic, and partially sectioned, view of the machine according to the invention.

The printing head 4 can be seen, for example, in FIG. 3 or 4.

The printing heads 4 can be of any type and will not be further described in detail.

The conveyor 2 comprises at least a movable member 5 for supporting the products P to be decorated.

The movable member 5 is suitable for translating the products 5 along said feed direction A.

According to an aspect of the present invention, the conveyor 2 comprises at least a supporting surface 6,7, located along a respective flank 8,9 of the movable member 5, provided with a plurality of predetermined positioning zones 10,11 for the removable engagement of respective coupling portions 12,13 of the decoration modules 3.

More in detail, the conveyor 2 comprises a first supporting surface 6 and a second supporting surface 7.

The first supporting surface 6 and the second supporting surface 7 are respectively positioned along the first flank 8 and along the second flank 9 of the movable member 5, in other words they are displaced opposite each other.

Therefore, the first supporting surface 6 and the second supporting surface 7 comprise respective pluralities of first positioning zones 10 and second positioning zones 11 for the modules 3, opposite to each other with reference to the movable member 5.

The first supporting surface 6 and the second supporting surface 7 are preferably horizontal or substantially horizontal, but they could also be differently arranged.

Each of the decoration modules 3 comprises a first coupling portion 12 and a second coupling portion 13, opposite each other with respect to the printing heads 4.

The first coupling portion 12 and the second coupling portion 13 are suitable to be connected, in a removable manner, respectively to the first positioning zones 10 and second positioning zones 11 of the conveyor 2.

More in detail, each decoration module 3 comprises a respective bottom portion 14 which, in operative conditions of the machine 1, faces downwards, i.e. towards the movable member 5 of the conveyor 2.

In other words, in use, the bottom portion 14 of each module 3 overhangs the movable member 5.

According to another aspect of the invention, the first coupling portion 12 and the second coupling portion 13 of each module 3 project downwards with respect to the above cited bottom portion 14 of the module 3 itself.

In this way, the ejection plane of the printing heads 4 is positioned, when the machine is running, at a suitable operative height relative to the surface of the products to be decorated P, as schematically shown in FIG. 4.

According to another aspect of the present invention, each of the decoration modules 3 comprises a respective box 15.

The box 15 includes the aforementioned coupling portions 12,13.

According to a further important aspect of the invention, the box 15 houses all components required to operate the module 3.

The box 15 of each module 3 is a sealed unit.

In particular, the box 15 may be provided with appropriate seals, or other equivalent elements, which prevent the entry of air inside the box 15, or at least that prevent the entrance of dust, mainly for cleaning needs and hygiene inside the volume delimited by the same box 15.

The conveyor 2 comprises a frame 16, resting on the floor by means of adjustable feet 16a that allow to compensate for any unevenness in the floor itself.

The movable member 5 of the conveyor 2 comprises a belt 5a.

The belt 5a develops along the feed direction A of the products P.

The belt 5a is mounted on two rollers 5b, 5c, one of which is normally motorized, and the other one is neutral.

The rollers 5b, 5c are rotatably supported by the frame 16 of the conveyor 2 in correspondence with two respective parallel rotation axes.

According to another aspect of the invention, the box 15 of each module 3 is associated with respective means for generating overpressure 17.

The means for generating overpressure 17 are suitable to provide a pressurized and air-conditioned environment in the inner volume of the box 15 of each module 3.

In particular, the generation of overpressure through the means 17—with respect to atmospheric pressure—inside the box 15 of each module 3, allows to preserve and keep stable the temperature of the printing heads 4, of the fluid which passes through them, and the correct functionality of all the components and functional groups of the module 3.

Moreover, the means for generating overpressure 17 prevent the entry of impurities, possibly coming from the surrounding work environment, within the box 15, which is then kept in optimum conditions of cleanliness.

The means for generating overpressure 17 are at least partially housed in the frame 16 of the conveyor.

As it is apparent, the frame 16 of the conveyor 2 becomes an active member which is integral with the operation of the entire machine 1, according to the invention.

The means for generating overpressure 17 are at least partially housed in the frame 16 in a position located below the belt 5a (see in particular FIG. 8).

The box 15 of each module 3 comprises a first portion 18 which, in use, is located substantially above the movable member 5 of the conveyor 2.

Furthermore, the box 15 of each module 3 comprises a second portion 19, connected to the first portion 18, which protrudes laterally from one of the flanks 8,9 of the conveyor, in particular from the second flank 9.

The second portion 19 of the box 15 houses some of the components necessary for the operation of the module 3.

As it is apparent, the second portion 19 completely—and advantageously—replaces the back cabinets of the machines of known type.

Each decoration module 3 comprises supply means 20 of the fluid, to be delivered on the surfaces of the products P, to the printing heads 4.

The supply means 20 are, in particular, completely housed inside the box 15.

Furthermore, according to another aspect of the invention, each module 3 comprises a respective fluid tank 21.

Also the fluid tank 21 is completely housed inside the box 15; in particular, the fluid tank 21 is housed inside the second portion 19 of the box 15.

According to a further aspect of the invention, the machine 1 comprises a filling area 22 of the fluid tanks 21 of each of the modules 3.

Such filling area 22 is placed along one of the flanks 8,9 of the conveyor 2; more in detail, the filling area 22 is placed along the first flank 8.

The filling area 22 comprises a plurality of orifices 23, through which respective fluids to be delivered on the products P can be poured.

Figure 2:
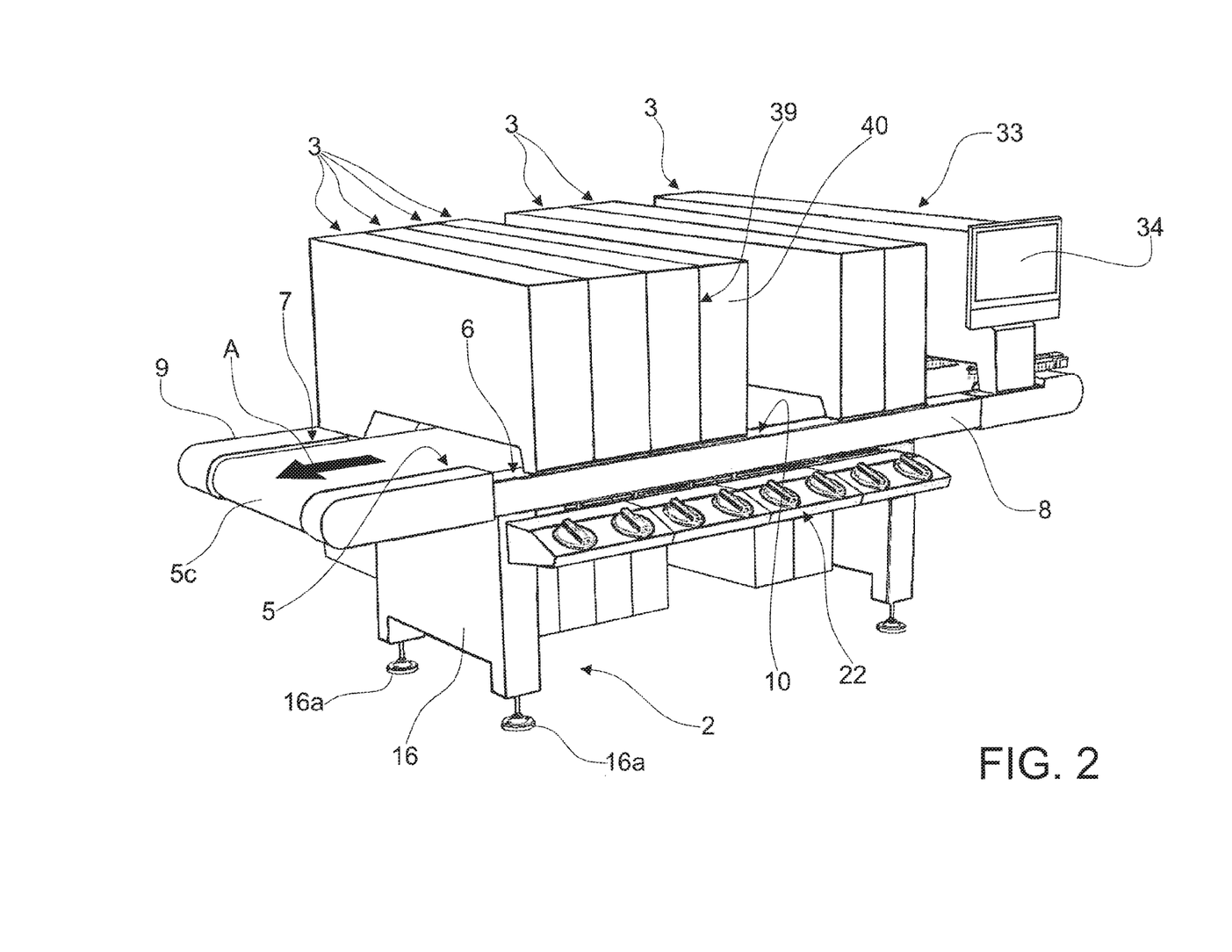
FIG. 2 is a perspective view of the machine from a different angle.

The orifices 23 are arranged in a row along the first flank 8 of the conveyor 2, as shown for example in FIGS. 1-3.

Each of the orifices 23 is provided with a respective closing plug 24.

Each orifice 23 is placed in communication with the fluid tank 21 of the respective module 3 through a supply duct 25 (schematically shown in FIG. 4).

This solution is particularly advantageous since the user can fill the tanks 21 of the various modules 3 in a very rapid and easy way by standing in front of the machine 1, without having to remove parts, open drawers, or perform other laborious tasks.

According to another aspect of the invention, each of the modules 3 comprises respective suction means 26,27 for cleaning the printing heads 4 and/or the working area between the heads 4 themselves and the surface of the products to be decorated P.

The suction means 26, 27 are at least partially housed in the frame 16 of the conveyor 2.

More in detail, the suction means 26, 27 comprise first suction means 26, having at least a respective first suction inlet facing the printing heads 4.

The first suction means 26 comprise, for example, a sliding suction member (not shown), movable along a direction perpendicular to the feed direction A; the sliding suction member is suitable to pass in sequence below the printing heads 4 to clean their surface directly via the aforesaid first suction inlet.

In this way, fluid residues, that may drip on the belt 5a, or on the products P in transit, are removed.

The sliding suction member is associated to respective translation means, comprising for example a screw actuator, or the like.

The first suction means 26 are at least partially housed in the frame 16 in a position located below the belt 5a (see in particular FIG. 4).

The suction means 26, 27 further comprise second suction means 27, having respective second suction inlets facing the movable member 5 of the conveyor 2.

The second suction means 27 effectively remove, from the working area between the printing heads 4 and the surface of the products P to be decorated, the vapours in suspension generated by the printing heads 4 and by the products P themselves, which can cross the machine 1 when they are still at elevated temperature after leaving the production kiln.

The second suction means 27 comprise suction elements (not shown) which develop in a direction perpendicular to the feed direction A.

The second suction means 27 are at least partially housed in the frame 16 in a position located below the belt 5a (see in particular FIG. 4).

As shown in FIG. 3, in the second positioning zones 11 of the conveyor 2, for each module 3 associable to the conveyor 2 itself, a suction hole 27a is foreseen, which communicates with the second suction means 27.

According to a further aspect of the invention, the machine 1 comprises valve means 28 suitable to manage the flow rate of air flowing through the means for generating overpressure 17 and the first and second suction means 26,27.

The valve means 28 are schematically shown in FIG. 4; such valve means 28 can be placed in communication, for example, with the suction branch 28a and with the delivery branch 28b of the compressed air system of the plant where the machine 1 is installed.

The valve means 28 allow to manage the operation of the means for generating overpressure 17, the first suction means 26 and the second suction means 27 in the various operating conditions of the machine 1.

The valve means 28 are specially designed in order to open/close/partialize the air flow in the cited means 17, 26, 27.

Each module 3 comprises, inside the respective box 15, a local control unit 29; such local control unit 29 manages, specifically, the fluid delivery by the printing heads 4 provided in the module 3 itself.

The local control unit 29 is housed for example, in the second portion 19 of the box 15.

As shown in FIG. 4, the local control unit 29 is housed in a respective lodging 29a; the local control unit 29 is extractable from the second portion 19, being associated to respective guides 29b.

Each module 3 further comprises respective local electrical power supply means, also housed inside the box 15.

An important characteristic of the present invention is that each module 3 comprises and houses therein support means 30 for at least the printing heads 4. The support means 30, together with the printing heads 4, are vertically movable, with respect to the box 15, by means of actuation means 31, along respective guides 32 foreseen in the box 15.

The actuation means 31 allow selectively moving at least the printing heads 4 between a first upper inactive position and a second lower operative position.

Under normal operation conditions of the module 3, the support means 30 are in the second lower operative position, so that the printing heads 4 are positioned at the correct distance for printing on the surface of the products P.

When the same module 3 is not used, instead, the support means 30, carrying the printing heads 4, can be translated in the first upper inactive position, where the printing heads 4 are sufficiently spaced from the surface of the products P.

This measure has the purpose of protecting the printing heads 4 of that specific module 3, which is temporarily unused, from thermal radiations possibly generated by the passing products P, and/or by the fluid particles emitted by the other printing heads 4 of the machine that are suspended in the printing area.

In this manner the printing heads 4, suitably preserved, can have a longer duration, and/or the maintenance or cleaning interventions are consequently cheaper and easier.

The actuation means 31 can be of manual or motorized type and comprise, for example, at least a linear actuator supported, with vertical translation axis, somewhere in the inner wall of the box 15, and associated with the support means 30.

In the embodiment of the invention illustrated in the figures, the actuation means 31 comprise an electric motor, for example a stepper electric motor. In some embodiments of the invention, the actuation means 31 can comprise more than one linear actuator for the translation of the support means 30 bearing the printing heads 4.

The machine 1 comprises at least a central processing unit 33.

The modules 3 are operatively connected to the central processing unit 33.

The central processing unit 33 is adapted, in particular, to manage the coordinated operation of the modules 3 and of the conveyor 2, during a certain decoration work.

The central processing unit 33 is coupled, in a removable manner, to at least one of the supporting surfaces 6, 7 of the conveyor 2, preferably to both supporting surfaces 6,7.

The central processing unit 33 comprises an interface 34, through which the user can set all the operating parameters of the machine 1.

The central processing unit 33 comprises a respective supporting box-like structure 35, having shape completely similar to that of the modules 3, mainly with regard to the coupling with the supporting surfaces 6,7 of the conveyor 2.

According to an aspect of the invention, the central processing unit 33 comprises at least a detection device 36 for sensing the dimensional and/or structural and/or surface parameters of the products P entering the decorating area of the machine 1.

Such detection device 36 is placed in a portion of the supporting box-like structure 35 facing the movable member 5.

In a preferred embodiment of the invention, such detection device 36 comprises at least a laser detector, which is particularly suitable for sensing the surface features of the products P.

For example, if a product P has raised surface portions to be decorated with a certain colour or graphical pattern, such raised portions are sensed by the detection device 36, and the central processing unit 33 is therefore able to set the operating parameters of the printing heads 4 involved in such decoration work.

The central processing unit 33, in an embodiment of the invention, comprises guide means 37 for the products P entering the machine 1.

The guide means 37 are adjustably associated to the portion of the supporting box-like structure 35 facing the movable member 5.

According to another aspect of the present invention, in each module 3, at least the support means 30 of the printing heads 4 are slidably associated with the respective box 15 according to a substantially horizontal direction, by interposition of at least one guide 38, of any type (see FIG. 3).

Together with the support means 30, also other components can be slidably associated with the box 15, such as, for example, the fluid supply means 20, which can be rigidly connected to the support means 30.

The support means 30—and other means connected to the latter—can thus be completely translated frontally and horizontally outside of the box 15, and possibly also completely extracted and removed, for the sake of maintenance, replacement, or others.

An easy lateral access to the support means 30 by operators is therefore ensured, the operators thus being able to carry out any maintenance intervention or the like.

For this purpose, the box 15 of each module 3 frontally defines an opening 39 closed by a respective door 40.

The door 40 can be for example of concealed type, that is recessed inside the box 15 to allow access to the opening 39 and at the same time to limit bulk.

For example, the door 40 can be associated with particular hinges or rotation mechanisms allowing the positioning thereof under the upper wall of the box 15, in a minimal bulk position.

As regards the removable coupling of each of the modules 3 with the first and second positioning zones 10,11 of the conveyor 2, centering means are foreseen in order to allow quick and easy engagement of the modules 3 in the respective positioning zones 10,11.

For example, such centering means can comprise conical or frustoconical appendages foreseen in the first and/or second coupling portion 12,13 of each module 3, and respective conical or frustoconical seats 41 foreseen in the first and second positioning zones 10,11.

It has thus been shown how the invention achieves the intended objects.

As shown, for example, in FIG. 3, some or all the modules 3 of the machine 1 can be very easily and quickly removed from the conveyor 2, and they can be placed, for example, on another machines 1 of similar kind.

Also the central processing unit 33 can be easily and quickly removed from the conveyor 2 of the machine 1.

This allows a great versatility in the use of the machine 1, which can be completely customized according to user's needs.

The inactive modules 3 on a certain machine 1 can be removed and be placed on another machine 1 where they can be immediately activated.

This means that the operative resources are optimized, also in terms of space needed for performing different decoration works.

The solution proposed is cheap and cost-saving in terms of energy consumption.

The present invention has been described according to preferred embodiments, but equivalent variants can be conceived without departing from the scope of protection offered by the following claims.

The invention claimed is:

1. A digital decorating machine for ceramic products, said products having surfaces to be decorated, comprising at least a conveyor to transport the products to be decorated along a feed direction, and a plurality of decoration modules, positioned over said conveyor and adjacent to each other along said feed direction, said modules comprising respective printing heads provided with nozzles for ejecting a fluid to be delivered said surfaces of the products to be decorated, said conveyor comprising at least a movable member for supporting the products to be decorated, for translating them along said feed direction, wherein each of said modules comprises a box and all the components required to operate the module housed inside said box, and wherein said box is a sealed unit and wherein said box is associated with respective means for generating overpressure which provide a pressurized and air-conditioned environment inside an inner volume of said box, and wherein said box is provided with seals which prevent the entry of air inside said box, or which prevent the entrance of dust inside said box, for cleaning needs and hygiene inside the volume delimited by said box.

2. The machine according to claim 1, wherein said movable member comprises a first flank and a second flank, and wherein said conveyor comprises a first supporting surface and a second supporting surface, respectively positioned along said first flank and said second flank of said movable member, said first supporting surface and said second supporting surface comprising respective pluralities of first positioning zones and second positioning zones for the modules, opposite to each other with reference to said movable member.

3. The machine according to claim 2, wherein each of said modules comprises a first coupling portion and a second coupling portion, opposite each other with respect to said printing heads, to be connected, in a removable manner, respectively to said first positioning zones and second positioning zones.

4. The machine according to claim 3, wherein each module comprises a respective bottom portion, wherein said printing heads define an ejection plane, and wherein said first coupling portion and said second coupling portion of each module project downwards with respect to said bottom portion of the module itself, so that said ejection plane of said printing heads is positioned, in operation, at an operative height relative to said surfaces of the products to be decorated.

5. The machine according to claim 1, wherein said means for generating overpressure are least partially housed in a frame of the conveyor.

6. The machine according to claim 1, wherein each of said modules comprises supply means for the fluid to be delivered to said printing heads, and a fluid tank, both housed inside said box.

7. The machine according to claim 6, wherein said movable member comprises a first flank and a second flank, and wherein said box comprises a first portion which, in use, is located substantially above said movable member, and a second portion, connected to said first portion, which protrudes laterally from one of said flanks, and which houses at least some of the components necessary for the operation of said module.

8. The machine according to claim 7, wherein said fluid tank is housed inside said second portion of said box.

9. The machine according to claim 6, comprising a filling area of said fluid tanks of each of said modules, said filling area being placed along one of said flanks of said conveyor.

10. The machine according to claim 9, wherein said filling area comprises a plurality of orifices, through which respective fluids to be delivered on the products can be poured, said orifices being arranged in a row along one of said flanks, said orifices being placed in communication with the respective fluid tanks through respective supply ducts.

11. The machine according to claim 1, wherein each of said modules comprises respective suction means for cleaning said printing heads and/or for cleaning the working area between said printing heads and the surface of the products to be decorated.

12. The machine according to claim 11, wherein said suction means comprise first suction means having at least a respective first suction inlet facing said printing heads.

13. The machine according to claim 12, wherein said suction means comprise second suction means having respective second suction inlets facing said movable member.

14. The machine according to claim 12, wherein said suction means are at least partially housed in a frame of said conveyor.

15. The machine according to claim 13, comprising valve means to manage the flow rate of air flowing through said means for generating overpressure and through said first and second suction means.

16. The machine according to claim 13, wherein each of said modules comprises a respective local control unit housed inside the respective box.

17. The machine according to claim 16, wherein said local control unit is housed in a respective lodging, said local control unit being extractable from said second portion.

18. The machine according to claim 1, wherein said conveyor comprises a first supporting surface and a second supporting surface, and wherein the machine comprises a central processing unit, coupled in a removable manner to at least one of said supporting surface of said conveyor, said modules being operatively connected to said central processing unit.

19. The machine according to claim 1, comprising at least a detection device for sensing the dimensional parameters and/or raised surface portions of the products entering the decorating area of the machine.

20. The machine according to claim 19, wherein said detection device comprises at least a laser detector, which is for sensing the raised surface portions of the products.

21. The machine according to claim 3, wherein said first and second positioning zones and said first and second coupling portions comprise respective centering means to allow quick and easy engagement of said modules in said positioning zones.

22. The machine according to claim 21, wherein said centering means comprise conical or frustoconical appendages provided in the first and/or second coupling portion of each of said modules, and respective conical or frustoconical seats provided in said first and second positioning zones.

23. A digital decorating machine for ceramic products, said products having surfaces to be decorated, comprising at least a conveyor to transport the products to be decorated along a feed direction, and a plurality of decoration modules, positioned over said conveyor and adjacent to each other along said feed direction, said modules comprising respective printing heads provided with nozzles for ejecting a fluid to be delivered on said surfaces on the products to be decorated, said conveyor comprising at least a movable member for supporting the products to be decorated for translating them along said feed direction, wherein each of said modules comprises a box and all the components required to operate the module housed inside said box, and wherein said box is a sealed unit and wherein said box is associated with respective means for generating overpressure, which provide a pressurized and air-conditioned environment inside an inner volume of said box, wherein each of said modules comprises support means for said printing heads, wherein said support means are housed inside said box, and wherein said support means, together with said printing heads, are vertically movable, with respect to said box, by a linear actuator, along respective guides provided in said box.

* * * * *